(12) United States Patent
Yamada et al.

(10) Patent No.: US 6,605,559 B1
(45) Date of Patent: Aug. 12, 2003

(54) DIMETHYL ETHER REFORMING CATALYST

(75) Inventors: Koji Yamada, Ikeda (JP); Koichiro Asazawa, Ikeda (JP); Hirohisa Tanaka, Ikeda (JP)

(73) Assignee: Daihatsu Motor Co., Ltd. (JP)

( * ) Notice: Subject to any disclaimer, the term of this patent is extended or adjusted under 35 U.S.C. 154(b) by 0 days.

(21) Appl. No.: 09/653,362

(22) Filed: Aug. 31, 2000

(30) Foreign Application Priority Data

Sep. 29, 1999 (JP) .......................................... 11-275997
Sep. 29, 1999 (JP) .......................................... 11-275998
Sep. 29, 1999 (JP) .......................................... 11-275999

(51) Int. Cl.$^7$ ................................................ B01J 29/06
(52) U.S. Cl. ........................................... 502/63; 502/64
(58) Field of Search ........................... 502/60, 74, 331, 502/345, 346, 208, 64, 67, 87, 63

(56) References Cited

U.S. PATENT DOCUMENTS 4,251,391 A * 2/1981 Mauldin et al. ............ 208/138
4,302,359 A * 11/1981 Mauldin et al. ............ 502/331
4,981,982 A * 1/1991 Yokoyama et al. ......... 552/208
5,397,561 A * 3/1995 Smith ......................... 423/704
5,834,395 A * 11/1998 Honda ........................ 502/346

FOREIGN PATENT DOCUMENTS

EP 0 754 649 A1 1/1997
JP 11-106770 4/1999

* cited by examiner

Primary Examiner—Stanley S. Silverman
Assistant Examiner—Edward M. Johnson
(74) Attorney, Agent, or Firm—George T. Marcou; Kilpatrick Stockton LLP (57) ABSTRACT

A dimethyl ether reforming catalyst that can reform dimethyl ether to produce a mixed gas of higher concentration of hydrogen and a fuel cell device using the dimethyl ether reforming catalyst. In the dimethyl ether reforming catalyst, copper, or copper and at least one transition metal except the copper is supported on a solid acid. A mixed gas obtained by a reforming device using the dimethyl ether reforming catalyst is fed to the fuel cell as a fuel gas.

14 Claims, 2 Drawing Sheets

DIMETHYL ETHER REFORMING CATALYST

BACKGROUND OF THE INVENTION

1. Field of the Invention

This invention relates to a dimethyl ether reforming catalyst, particularly, a dimethyl ether reforming catalyst for reforming dimethyl ether used as a raw material of fuel gas of a fuel cell, and to a fuel cell device using the dimethyl ether reforming catalyst.

2. Description of the Prior Art

In general, a polymer electrolyte fuel cell in which an anode and a cathode are arranged at both sides of a proton-conductive polymer electrolyte membrane is known as a fuel cell. In the polymer electrolyte fuel cell, fuel gas mainly including hydrogen is supplied to the anode and oxidation gas such as air is supplied to the cathode, whereby the electrochemical reaction is generated to shift proton in the polymer electrolyte membrane, to thereby produce electromotive force. This polymer electrolyte fuel cell is known as an energy-efficient fuel cell that can convert chemical energy of the fuel gas to electrical energy directly.

It is well known that in this polymer electrolyte fuel cell, for example methanol, which is used as a raw material of the fuel gas, is brought into contact with steam so that it can be reformed to produce the fuel gas to be supplied to the anode. Typically, a Cu—Zn catalyst is widely used for such a reform of methanol.

In addition to methanol, various raw materials, such as natural gases, are being proposed as the raw material of the fuel gas. Among others, dimethyl ether, which is easily liquefied when pressurized to several atmospheres (e.g. 5 atmosphere) at room temperature or when reduced to very low temperature (e.g. −25° C.), is in hopes of use in terms of conveyance, storage and easiness to handle.

However, even when dimethyl ether is brought into contact with steam, for example, in the presence of the Cu—Zn catalyst so that it can be reformed to produce hydrogen, the concentration of hydrogen in the mixed gas obtained by that reform is low and such is not of practical.

European patent bulletin (EP-A-754649) describes the method that dimethyl ether is allowed to react with steam by the following formulas in the presence of a catalyst obtained by solid acid and a methanol decomposing catalyst being physically mixed, to thereby produce a mixed gas rich in hydrogen.

$$CH_3OCH_3+H_2O \rightarrow 2CH_3OH \quad (1)$$

$$CH_3OH+H_2O \rightarrow 3H_2+CO_2 \quad (2)$$

However, the concentration of hydrogen in the mixed gas obtained by this method is still insufficient. Accordingly, a mixed gas of higher concentration of hydrogen is being desired for use as a fuel gas of a fuel cell.

It is the object of the present invention to provide a dimethyl ether reforming catalyst that can reform dimethyl ether to produce a mixed gas of higher concentration of hydrogen. Also, it is the object of the present invention to provide a fuel cell device using the dimethyl ether reforming catalyst.

SUMMARY OF THE INVENTION

The present invention is directed to a novel dimethyl ether reforming catalyst wherein copper, or copper and at least one transition metal except the copper is supported on a solid acid.

It is preferable that the solid acid is at least one material selected from by the group consisting of activated alumina, silica-alumina and zeolite. Preferably, an amount of supported copper, or an amount of supported copper and at least one transition metal except the copper, to the solid acid is 4–20 weight %.

It is preferable that the dimethyl ether reforming catalyst is produced by the copper, or the copper and the at least one transition metal except the copper being supported on the solid acid molded to have a predetermined size. Preferably, the solid acid is molded into a fine form. Further preferably, the solid acid is molded into a pellet form having a diametral length of 3.5 mm or less or a granular form having a particle size of 2 mm or less.

Also, it is also preferable that the dimethyl ether reforming catalyst is produced by the copper, or the copper and the at least transition metal except the copper being supported on the solid acid and then being pulverized. Preferably, the dimethyl ether reforming catalyst is pulverized into a fine form. Particularly, the dimethyl ether reforming catalyst is preferably pulverized to have a particle size of 2 mm or less.

Further, it is also preferable that the dimethyl ether reforming catalyst further comprises a solid strong acid. Preferably, the solid strong acid is solidified phosphoric acid and/or heteropoly acid. Also, it is preferable that the solid acid on which the copper, or the copper and the at least one transition metal except the copper is supported and the solid strong acid have a fine form. Particularly, the solid acid on which the copper, or the copper and the at least one transition metal except the copper is supported and the solid strong acid have a particle size of 2 mm or less. Further, it is preferable that the solid acid on which the copper, or the copper and the at least one transition metal except the copper is supported and the solid strong acid are in volume ratios in the range of 1:3 to 3:1.

The present invention includes a fuel cell device comprising (i) a reforming device using a dimethyl ether catalyst in which copper, or copper and at least one transition metal except the copper is supported on a solid acid, to reform dimethyl ether and thereby produce a mixed gas and (ii) a fuel cell to which the mixed gas is fed as a fuel gas.

DETAILED DESCRIPTION OF THE PREFERRED EMBODIMENTS

In the following, the present invention will be described in detail by way of an illustrative embodiment.

A dimethyl ether reforming catalyst of the present invention is used to reform dimethyl ether to produce a mixed gas rich in hydrogen. In the dimethyl ether reforming catalyst of the present invention, copper, or copper and at least one transition metal except the copper is supported on a solid acid.

The solid acids which may be used include, for example, metallic oxide, binary metallic oxide, zeolite, metallic sulfate, metallic phosphate, solidified sulfuric acid, solidified phosphoric acid, cation exchange resin and heteropoly acid.

The metallic oxides which may be used include, for example, activated alumina. Preferably, γ-alumina, δ-alumina and θ-alumina are used.

The binary metallic oxides which may be used include, for example, $SiO_2$—$A_2O_3$, $SiO_2$—$ZrO_2$, $TiO_2$—$Al_2O_3$, $TiO_2$—$ZrO_2$, $TiO_2$—$SiO_2$ and $Al_2O$—$ZrO_2$. Preferably, $SiO_2$—$A_2O_3$ is used as the binary metallic oxide.

Preferably used as the zeolite is MFI zeolite (ZSM-5).

The solidified phosphoric acids which may be used include, for example, $P_2O_5$—$SiO_2$—$TiO_2$ and $P_2O_5$—$SiO_2$.

The heteropoly acids which may be used include, for example, P—Mo—CS—$SiO_2$.

These solid acids may be used singularly or in combination of two or more of these. Of these solid acids, metallic oxide, binary metallic oxide and zeolite are preferably used. Activated alumina, silica-alumina and zeolite are further preferably used.

Cited as the copper, or the copper and the at least one transition metal except the copper are, for example, copper (Cu), or copper (Cu) and at least one transition metal except the copper selected from the group of e.g. chromium (Cr), manganese (Mn), iron (Fe), cobalt (Co), nickel (Ni) and zinc (Zn). Preferably, zinc (Zn), manganese (Mn) and chromium (Cr) are used as the at least one transition metal except the copper.

The amount of supported copper, or the amount of supported copper and at least one transition metal except the copper, to the solid acid is preferably 4–20 weight %, or further preferably 5–15 weight %. In the amount of less than 4 weight %, insufficient catalytic activity can be produced. On the other hand, in the amount of more than 20 weight %, the effect of improvement of the catalytic activity for the amount of copper used or for the amount of the copper and at least one transition metal except the copper used can be weakened.

The dimethyl ether reforming catalyst of the present invention can be produced by copper, or the copper and the at least one transition metal except the copper being supported on a solid acid having a predetermined size.

The solid acid that is formed to have a required size by a known molding method, such as tableting or extrusion molding, is preferably used as the solid acid having the predetermined size. While no particular limitation is imposed on the form of the solid acid, it is preferably formed into fine configuration or form such as a pellet form. The termination of "pellet form" is intended to include any pillar form, such as a cylindrical form and a prismatic form. The pellets preferably have a diametral length (width) of 3.5 mm or less, or further preferably 2.0 mm or less. While no particular limitation is imposed on the length of the pellets, the pellets preferably have the length of e.g. 20 mm or less, or further preferably 15 mm or less. To be more specific, the pellets are preferably extruded to have a diameter of 2.0–0.1 mm, for example, by the extrusion molding and then cut to a length of 20–1 mm.

Alternatively, commercially available products formed by tableting may be further pulverized to thereby produce the solid acids of a granular form. In this case, the solid acids are preferably pulverized into a granular form to have a particle size of 2 mm or less. To be more specific, those solid acids are pulverized, for example, by a dry process and then are classified in the particle size of 0.5–2.0 mm, or preferably 0.85–1.7 mm, by a screen and the like.

The copper, or the copper and the at least one transition metal except the copper can be supported on the solid acid in the following processes, for example. The solid acid is immersed in aqueous solution of salt of the copper, or the copper and the at least one transition metal except the copper so that the solid acid can be impregnated with the salt of the copper, or the copper and at least one transition metal except the copper and thereafter is dried and baked.

The salt of copper, or the copper and the at least one transition metal except the copper includes, for example, nitrate, acetate, oxalate and tetraammine sulfate. The aqueous solution is prepared so that the concentration of the salt of the copper, or the copper and the at least one transition metal except the copper can be 5–50 weight %, for example. The solid acid is used in the proportion of about 150 to about 300 parts by weight per 100 parts by weight of aqueous solution. The aqueous solution may be heated during the impregnation.

After the impregnation, the solid acid is dried in a drying furnace at about 80 to about 100° C. to evaporate moistures contained in the solid acid. Thereafter, it is baked in a baking furnace and the like at about 300 to about 600° C., or preferably about 400 to about 500° C. to decompose and remove the salt of copper or the salt of the copper and the at least one transition metal except the copper. The copper, or the copper and the at least one transition metal except the copper can be supported on the solid acid in this way. The drying and the baking may continuously be performed without being performed separately.

The dimethyl ether reforming catalyst thus obtained is not the one formed by the solid acid, and the copper, or the copper and the at least one transition metal except the copper being physically mixed with each other, but is the one formed solely by the copper, or the copper and the at least one transition metal except the copper being supported on the solid acid. This dimethyl ether reforming catalyst can be effectively used as a catalyst for use in reforming the dimethyl ether to produce a mixed gas rich in hydrogen. When dimethyl ether is reformed in the presence of this dimethyl ether reforming catalyst, a mixed gas having high concentration of hydrogen can be obtained.

Alternatively, the dimethyl ether reforming catalyst of the present invention can also be produced in the following processes, for example. The copper, or the copper and the at least one transition metal except the copper is supported on the solid acid having a predetermined size and then the solid acid is pulverized.

The copper, or the copper and the at least one transition metal except the copper can be supported on the solid acid in the same manner as in the aforesaid processes. For example, the solid acid is immersed in aqueous solution of salt of the copper, or the copper and the at least one transition metal except the copper so that the solid acid can be impregnated with the salt of the copper, or the copper and the at least one transition metal except the copper and thereafter is dried and baked.

Subsequently, the solid acid on which the copper, or the copper and the at least one transition metal except the copper was supported is pulverized. No limitation is imposed on the pulverizing method. The solid acid can be pulverized by any known method. For example, it is pulverized by the dry process. In this pulverizing process, the solid acid is preferably pulverized into a granular form to have a particle size of 2 mm or less, for example. To be more specific, after having pulverized, the solid acid is preferably classified in the particle size of 0.5–2.0 mm, or preferably 0.85–1.7 mm, by a screen and the like, for example.

The dimethyl ether reforming catalyst thus obtained has a surface on which the copper, or the copper and the at least one transition metal except the copper is supported and a surface on which the solid acid is exposed by the pulverization. This dimethyl ether reforming catalyst can be effectively used as a catalyst for use in reforming the dimethyl ether to produce a mixed gas rich in hydrogen. When dimethyl ether is reformed in the presence of this dimethyl ether reforming catalyst, a mixed gas having high concentration of hydrogen can be obtained.

It is also preferable for the dimethyl ether reforming catalyst of the present invention that a solid strong acid is blended with the solid acid thus obtained on which the copper, or the copper and the at least one transition metal except the copper is supported.

The solid strong acids which may be used include, for example, binary metallic oxide, solidified sulfuric acid, solidified phosphoric acid and heteropoly acid of the above-mentioned solid acids. These solid strong acids can be used singularly or in combination of two or more of these. Of these solid strong acids, solidified phosphoric acid and/or heteropoly acid are preferably used. Though no particular limitation is imposed on the form and size of the solid strong acids, the solid strong acids preferably have fine configuration. For example, those having the particle size of 2.0 mm or less are preferably used. To be more specific, the solid strong acid is preferably pulverized, for example, by the dry process and classified in the particle size of 0.5–2.0 mm, or preferably 0.85–1.7 mm, by a screen and the like. Of the solid strong acids, the solidified phosphoric acid preferably has a specific surface area of 10 m$^2$/g or more and the heteropoly acid preferably has a specific surface area of 50 m$^2$/g or more.

Preferably, the solid acid on which the copper, or the copper and the at least one transition metal except the copper is supported and the solid strong acid are blended in volume ratios in the range of 1:3 to 3:1, though not particularly specified.

When the solid acid on which the copper, or the copper and the at least one transition metal except the copper is supported is more than that, the reaction to produce methanol from diethyl ether becomes slow. On the other hand, when the solid strong acid is more than that, the reaction to produce hydrogen from methanol becomes slow. The well-balanced reaction to reform the dimethyl ether is performed in the specific range as noted above. No particular limitation is imposed on the blending method.

The solid acid and the solid strong acid may physically be stirred and mixed by a known method.

The dimethyl ether reforming catalyst thus obtained has the feature that the solid strong acid is further blended in the solid acid on which the copper, or the copper and the at least one transition metal except the copper is supported. This dimethyl ether reforming catalyst can be effectively used as a catalyst for use in reforming the dimethyl ether to produce a mixed gas rich in hydrogen. When dimethyl ether is reformed in the presence of this dimethyl ether reforming catalyst, a mixed gas having high concentration of hydrogen can be obtained.

Figure 1:
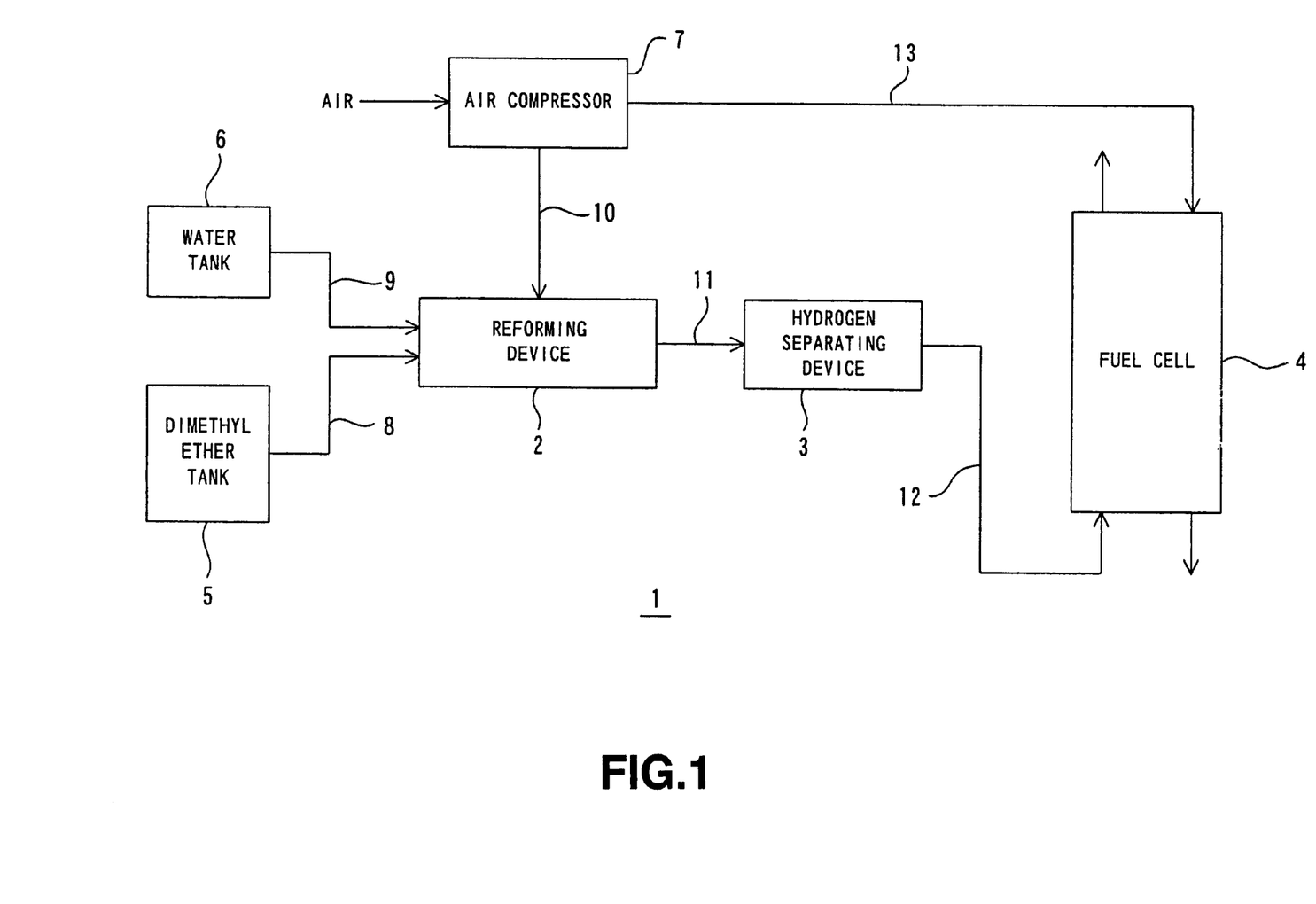
FIG. 1 is a block diagram showing an entirety of a fuel cell device in one embodied form of the present invention.

Next, description on a fuel cell device using the dimethyl ether reforming catalyst of the present invention will be given below. Referring to FIG. 1, there is shown a block diagram showing an entirety of a fuel cell device in one embodied form of the present invention. In FIG. 1, the fuel cell device 1 includes a reforming device 2, a hydrogen separating device 3 and a fuel cell 4 as a main constitution. It also includes a dimethyl ether tank 5, a water tank 6, an air compressor 7, and so on as an auxiliary constitution.

The dimethyl ether tank 5 and the water tank 6 are connected to the reforming device 2 through a pipe 8 and a pipe 9, respectively. Dimethyl ether that is the material to be reformed is stored in the dimethyl ether tank 5. Water used for steam reforming in the reforming device 2 is stored in the water tank 6. The dimethyl ether is fed in a predetermined proportion from the dimethyl ether tank 5 to the reforming device 2 and also the water is fed in a predetermined proportion from the water tank 6 to the reforming tank 2.

The reforming device 2 is provided with a heating portion having a heater and a reforming portion that is packed with the dimethyl ether reforming catalyst of the present invention. The dimethyl ether and the water fed to the reforming device 2 are heated by the heater in the heating portion, so that the demethyl ether is increased up to a reforming temperature and also the water is evaporated (or converted into steam). Subsequently, the dimethyl ether undergoes the steam reforming in the reforming portion.

The steam reforming brings the dimethyl ether into contact with steam to produce a mixed gas rich in hydrogen in the following reactions. The steam reforming is preferably performed at about 250 to about 400° C., for example.

$$CH_3OCH_3+H_2O \rightarrow 2CH_3OH \tag{1}$$

$$CH_3OH+H_2O \rightarrow 3H_2+CO_2 \tag{2}$$

Besides these, a small amount of carbon monoxide (CO) is also produced in these reactions.

The compressor 7 is connected to the reforming device 2 through a pipe 10. The air can be fed from the compressor 7 to the reforming portion so that the reform using partial oxidation by the following reaction can be done in combination with the steam reforming.

$$CH_3OH+1/2O_2 \rightarrow 2H_2+CO_2 \tag{3}$$

The hydrogen separating device 3 is connected to the reforming device 2 through a pipe 11. The mixed gas rich in hydrogen produced by the reforming portion is fed to the hydrogen separating device 3 through the pipe 11.

The small amount of carbon monoxide (CO) contained in the mixed gas is removed in the hydrogen separating device 3, because it becomes catalyst poison for platinum used as the catalyst for the anode. The hydrogen separating device 3 is packed with Pt or Pt—Ru catalyst, for example, so that the carbon monoxide is oxidized and removed in the presence of the catalyst.

The fuel cell device 4 is connected to the hydrogen separating device 3 through a pipe 12. The mixed gas from which the carbon monoxide was removed is fed to the fuel cell device 4 through the pipe 12 as the fuel gas.

The fuel cell 4 is a polymer electrolyte fuel cell having the stack structure in which a plurality of unit cells are stacked. The air compressor 7 is connected to the fuel cell 4 through a pipe 13. The air is fed from the air compressor 7 to the fuel cell 4 through the pipe 13.

Each of the unit cells has a sandwich structure in which a proton-conductive polymer electrolyte membrane such as a perfluorosulfonic acid type membrane is sandwiched between an anode and a cathode on which anode and cathode the platinum is supported. In the anode, the hydrogen in the fuel gas fed from the hydrogen separating device 3 through the pipe 12 produces proton and electron by the reaction given below:

$$H_2 \rightarrow 2H^+ + 2e^- \tag{4}$$

Then, the proton produced moves through the polymer electrolyte membrane toward the cathode, while the electron produced runs out to an external circuit (not shown). On the other hand, in the cathode, the oxygen in the air fed from the air compressor 7 through the pipe 13 undergoes the following reaction with the proton that moved in through the polymer electrolyte membrane and the electron that runs in from the external circuit, to thereby produce water. As a result of this, the electromotive force is produced.

$$1/2O_2 + 2H^+ + 2e^{31} \rightarrow H_2O \quad (5)$$

In the fuel cell device 1 of the illustrated embodiment of the present invention, a mixed gas having a high concentration of hydrogen is produced in the reforming device 2 packed with the dimethyl ether reforming catalyst of the present invention and then is fed to the fuel cell 4 as the fuel gas. Thus, the electric power can be generated with efficiency in the fuel cell 4.

EXAMPLES

In the following, the dimethyl ether reforming catalysts of the present invention will be described further specifically with reference to Examples and Comparative examples. The dimethyl ether reforming catalysts of the present invention is not in any manner limited to the illustrated examples.

Example 1

92 g of molded products having a cylindrical form (3.2 mm$\phi$×3.2 mmL) of commercially available γ-alumina (specific surface area of 200 m$^2$/g) were weighed. 30.4 g of Cu(NO$_3$)$_2$.3H$_2$O was weighed and then was dissolved in distilled water to prepare 45 weight % of copper nitrate aqueous solution. The γ-alumina weighed was added to the prepared aqueous solution and heated to 50–80° C., so as to be impregnated with the copper nitrate. Subsequently, it was dried in a drying furnace at 100° C. to evaporate moistures contained therein and, thereafter, was baked at 500° C. for 3 hours to decompose and remove the nitrate to thereby produce an alumina catalyst supporting thereon 8 weight % of copper.

Example 2

After molded products of commercially available γ-alumina (specific surface area of 200 m$^2$/g) were extruded, they were cut to produce pellets having a size of 1.1 mm$\phi$×15 mmL. Then, 92 g of the γ-alumina formed into pellets was weighed. 30.4 g of Cu(NO$_3$)$_2$.3H$_2$O was weighed and then was dissolved in distilled water to prepare 45 weight % of copper nitrate aqueous solution. The γ-alumina weighed was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce an alumina catalyst supporting thereon 8 weight % of copper.

Example 3

After molded products of commercially available γ-alumina (specific surface area of 200 m$^2$/g) were extruded, they were cut to produce pellets having a size of 1.1 mm$\phi$×7 mmL. Then, 92 g of the γ-alumina formed into pellets was weighed. 30.4 g of Cu(NO$_3$)$_2$.3H$_2$O was weighed and then was dissolved in distilled water to prepare 45 weight % of copper nitrate aqueous solution. The γ-alumina weighed was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce an alumina catalyst supporting thereon 8 weight % of copper.

Example 4

After molded products having a cylindrical form (3.2 mm$\phi$×3.2 mmL) of commercially available γ-alumina (specific surface area of 200 m$^2$/g) were pulverized by a dry process and then classified with two different screens with meshes of 1.7 mm and 0.85 mm to produce alumina grains having particle sizes of 1.7–0.85 mm. Then, 92 g of the alumina grains were weighed. 30.4 g of Cu(NO$_3$)$_2$.3H$_2$O was weighed and then was dissolved in distilled water to prepare 45 weight % of copper nitrate aqueous solution. The γ-alumina weighed was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce an alumina catalyst supporting thereon 8 weight % of copper.

Example 5

92 g of molded products having a cylindrical form (3.2 mm$\phi$×3.2 mmL) of commercially available silica-alumina (82% of SiO$_2$, 13% of Al$_2$O$_3$, and specific surface area of 400 m$^2$/g) were weighed. 30.4 g of Cu(NO$_3$)$_2$.3H$_2$O was weighed and then was dissolved in distilled water to prepare 45 weight % of copper nitrate aqueous solution. The silica-alumina was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce a silica-alumina catalyst supporting thereon 8 weight % of copper.

Example 6

After commercially available MFI zeolite (specific surface area of 360 m$^2$/g) was extruded, it was cut to produce pellets having a size of 1.6 mm $\phi$×7 mmL and 92 g of MFI zeolite formed into pellets was weighed. 30.4 g of Cu(NO$_3$)$_2$.3H$_2$O was weighed and then was dissolved in distilled water to prepare 45 weight % of copper nitrate aqueous solution. The zeolite weighed was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce a zeolite catalyst supporting thereon 8 weight % of copper.

Example 7–14

Except that the γ-alumina and the Cu(NO)$_2$.3H$_2$O were weighed so that the amount of supported copper to the γ-alumina could be 2, 4, 6, 8, 10, 15, 20 and 25 weight %, respectively, the same operations as in Example 1 were performed to produce alumina catalysts.

Example 15

92 g of molded products having a cylindrical form (3.2 mm$\phi$×3.2 mmL) of commercially available γ-alumina (specific surface area of 200 m²/g) were weighed. Then, 30.4 g of Cu(NO₃)₂.3H₂O was weighed and then was dissolved in distilled water to prepare 45 weight % of copper nitrate aqueous solution. The γ-alumina weighed was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce pellets of alumina supporting thereon 8 weight % of copper. Then, the pellets were pulverized by the dry process and were classified with two different screens with meshes of 1.7 mm and 0.85 mm to produce alumina catalysts having particle sizes of 1.7–0.85 mm.

Example 16

92 g of molded products having a cylindrical form (3.2 mmφ×3.2 mmL) of commercially available γ-alumina (specific surface area of 200 m²/g) were weighed. Then, 15.2 g of Cu(NO₃)₂.3H₂O and 18.2 g of Zn(NO₃)₂.6H₂O were weighed and then were dissolved in distilled water to prepare 45 weight % of nitrate aqueous solution. The γ-alumina weighed was added to the prepared aqueous solution and heated to 50–80° C., so as to be impregnated with the nitrate. Subsequently, it was dried in the drying furnace at 100° C. to evaporate moistures contained therein and, thereafter, was baked at 500° C. for 3 hours to decompose and remove the nitrate to thereby produce pellets of alumina supporting thereon 4 weight % of copper and 4 weight % of zinc. Then, the pellets were pulverized by the dry process and were classified with two different screens with meshes of 1.7 mm and 0.85 mm to produce alumina catalysts having particle sizes of 1.7–0.85 mm.

Example 17

92 g of molded products having a cylindrical form (3.2 mmφ×3.2 mmL) of commercially available silica-alumina (82% of SiO₂, 13% of Al₂O₃, and specific surface area of 400 m²/g) were weighed. 30.4 g of Cu(NO)₂.3H₂O was weighed and then was dissolved in distilled water to prepare 45 weight % of copper nitrate aqueous solution. The silica-alumina weighed was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce pellets of silica-alumina supporting thereon 8 weight % of copper. Then, the pellets were pulverized by the dry process and were classified with two different screens with meshes of 1.7 mm and 0.85 mm to produce silica-alumina catalysts having particle sizes of 1.7–0.85 mm.

Example 18

After commercially available MFI zeolite (specific surface area of 360 m²/g) was extruded, it was cut to produce pellets having a size of 1.6 mmφ×7 mmL and 92 g of the MFI zeolite formed into pellets was weighed. 30.4 g of Cu(NO)₂.3H₂O was weighed and then was dissolved in distilled water to prepare 45 weight % of copper nitrate aqueous solution. The zeolite weighed was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce pellets of zeolite supporting thereon 8 weight % of copper. Then, the pellets were pulverized by the dry process and were classified with two different screens with meshes of 1.7 mm and 0.85 mm to produce zeolite catalysts having particle sizes of 1.7–0.85 mm.

Example 19

After molded products having a cylindrical form (3.2 mmφ×3.2 mmL) of commercially available γ-alumina (specific surface area of 200 m²/g) were pulverized by the dry process and then classified with two different screens with meshes of 1.7 mm and 0.85 mm to produce alumina grains having particle sizes of 1.7–0.85 mm. Then, 92 g of the alumina grains were weighed. 30.4 g of Cu(NO₃)₂.3H₂O was weighed and then was dissolved in distilled water to prepare 45 weight % of copper nitrate aqueous solution. The γ-alumina weighed was added to the prepared aqueous solution and heated to 50–80 C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce grains of alumina supporting thereon 8 weight % of copper. In addition, commercially available solidified phosphoric acid (P₂O₅ (25%), SiO₂ (65%), TiO₂ (10%), specific surface area of 30–40 m²/g) was pulverized by the dry process and was classified with two different screens with meshes of 1.7 mm and 0.85 mm to produce grains of solidified phosphoric acid having particle sizes of 1.7–0.85 mm. Then, 58 mL of the grains of copper-supporting alumina and 58 mL of the grains of solidified phosphoric acid were mixed to obtain a mixed catalyst of copper-supporting alumina-solidified phosphoric acid.

Example 20

Commercially available solidified phosphoric acid (P₂O₅ (35%), SiO₂ (65%), specific surface area of 12–20 m²/g) was pulverized by the dry process and was classified with two different screens with meshes of 1.7 mm and 0.85 mm to produce grains of solidified phosphoric acid having particle sizes of 1.7–0.85 mm. Then, 58 mL of the grains of copper-supporting alumina obtained by the same operation as in Example 1 and 58 mL of the grains of solidified phosphoric acid were mixed to obtain a mixed catalyst of copper-supporting alumina-solidified phosphoric acid.

Example 21

Commercially available heteropoly acid (P (0.6%), Mo (23.5%), Cs (5.8%), SiO₂ (47.2%), specific surface area of 90–100 m²/g) was pulverized by the dry process and was classified with two different screens with meshes of 1.7 mm and 0.85 mm to produce grains of heteropoly acid having particle sizes of 1.7–0.85 mm. Then, 58 mL of the grains of copper-supporting alumina obtained by the same operation as in Example 1 and 58 mL of the grains of heteropoly acid were mixed to obtain a mixed catalyst of copper-supporting alumina-heteropoly acid.

Example 22

Except that 29 mL of the grains of copper-supporting alumina and 86 mL of the grains of heteropoly acid were mixed, the same operation as in Example 21 was conducted to obtain a mixed catalyst of copper-supporting alumina-heteropoly acid.

Example 23

Except that 86 mL of the grains of copper-supporting alumina and 29 mL of the grains of heteropoly acid were mixed, the same operation as in Example 21 was conducted to obtain a mixed catalyst of copper-supporting alumina-heteropoly acid.

Example 24

After molded products having a cylindrical form (3.2 mmφ×3.2 mmL) of commercially available silica-alumina (82% of $SiO_2$, 13% of $Al_2O_3$, specific surface area of 400 $m^2/g$) were pulverized by the dry process and then classified with two different screens with meshes of 1.7 mm and 0.85 mm to produce silica-alumina grains having particle sizes of 1.7–0.85 mm. Then, 92 g of the silica-alumina grains were weighed. 30.4 g of $Cu(NO)_2 \cdot 3H_2O$ was weighed and then was dissolved in distilled water to prepare 45 weight % of copper nitrate aqueous solution. The silica-alumina weighed was added to the prepared aqueous solution and heated to 50–80° C., so as to be impregnated with the copper nitrate. Subsequently, it was dried in the drying furnace at 100° C. to evaporate moistures contained therein and, thereafter, was baked at 500° C. for 3 hours to decompose and remove the nitrate to thereby produce grains of silica-alumina supporting thereon 8 weight % of copper. In addition, commercially available heteropoly acid (P (0.6%), Mo (23.5%), Cs (5.8%), $SiO_2$ (47.2%), specific surface area of 90–100 $m^2/g$) was pulverized by the dry process and was classified with two different screens with meshes of 1.7 mm and 0.85 mm to produce grains of heteropoly acid having particle sizes of 1.7–0.85 mm. Then, 58 mL of the grains of copper-supporting silica-alumina and 58 mL of the grains of heteropoly acid were mixed to obtain a mixed catalyst of copper-supporting silica-alumina-heteropoly acid.

Example 25

After commercially available MFI zeolite (specific surface area of 360 $m^2/g$) was extruded, it was cut to produce pellets having a size of 1.6 mmφ×7 mmL. The pellets of zeolite thus produced were pulverized by the dry process and classified with two different screens with meshes of 1.7 mm and 0.85 mm to produce grains of zeolite having particle sizes of 1.7–0.85 mm. 92 g of the zeolites thus produced were weighed. Also, 30.4 g of $Cu(NO3)_2 \cdot 3H_2O$ was weighed and then was dissolved in distilled water to prepare 45 weight % of copper nitrate aqueous solution. The zeolites weighed were added to the prepared aqueous solution and heated to 50–80° C., so as to be impregnated with the copper nitrate. Subsequently, they were dried in the drying furnace at 100° C. to evaporate moistures contained therein arid, thereafter, were baked at 500° C. for 3 hours to decompose and remove the nitrate to thereby produce grains of zeolite supporting thereon 8 weight % of copper. Then, commercially available heteropoly acid (P (0.6%), Mo (23.5%), Cs (5.8%), $SiO_2$ (47.2%), specific surface area of 90–100 $m^2/g$) was pulverized by the dry process and was classified with two different screens with meshes of 1.7 mm and 0.85 mm to produce grains of heteropoly acid having particle sizes of 1.7–0.85 mm. Then, 58 mL of the grains of copper-supporting zeolite and 58 mL of the grains of heteropoly acid were mixed to obtain a mixed catalyst of copper-supporting zeolite-heteropoly acid.

Comparative Example 1

Molded products having a cylindrical form (3.2 mmφ×3.2 mmL) of commercially available Cu—Zn catalysts (50.1% of CuO, 44.2% of ZnO) were used as they were.

Comparative Example 2

58 mL of molded products having a cylindrical form (3.2 mmφ×3.2 mmL) of commercially available Cu—Zn catalysts (50.1% of CuO, 44.2% of ZnO) and 58 mL of molded products having a cylindrical form (3.2 mmφ×3.2 mmL) of commercially available γ-alumina (specific surface area of 200 $m^2/g$) were mixed to produce a mixed catalyst of copper-zinc-alumina.

Comparative Example 3

After molded products having a cylindrical form (3.2 mmφ×3.2 mmL) of commercially available copper catalyst (37% of CuO, specific surface area of 40 $m^2/g$) were pulverized by the dry process and then classified with two different screens with meshes of 1.7 mm and 0.85 mm to produce grains of copper catalyst having particle sizes of 1.7–0.85 mm. Then, 26 g of the grains of the copper catalyst were weighed. In addition, after molded products having a cylindrical form (3.2 mmφ×3.2 mmL) of commercially available γ-alumina (specific surface area of 200 $m^2/g$) were pulverized by the dry process and then classified with two different screens with meshes of 1.7 mm and 0.85 mm to produce grains of alumina having particle sizes of 1.7–0.85 mm. Then, 64 g of the grains of the alumina were weighed. Then, the grains of copper catalyst and the grains of alumina were mixed to obtain a mixed catalyst of copper-alumina.

EVALUATION

Dimethyl ether was reformed under the following conditions by use of gas circulation reactors packing therein the catalysts of Examples 1–6 and 15–25 and Comparative Examples 1–3, respectively. The concentration of hydrogen (volume %), the concentration of monoxide (CO) (volume %) and the rate of reform of dimethyl ether (DME) (%) were measured by analyzing the components flown out of the reactors. The results are shown in TABLE 1.

Reactor Conditions:
Rate of flow of DME (gas): 0.5 L/min.
Rate of flow of $H_2O$ (liquid): 3 mL/min.
Amount of catalyst, amount of copper used, volume of catalyst and bed temperature are as in given TABLE 1 below.

TABLE 1

| Example/ Compara. Ex. | Ex. 1 | Ex. 2 | Ex. 3 | Ex. 4 | Ex. 5 | Ex. 6 | Ex. 15 | Ex. 16. | Ex. 17 | Ex. 18 | Ex. 19 |
|---|---|---|---|---|---|---|---|---|---|---|---|
| Amount of catalyst (g) | 95 | 58 | 72 | 90 | 83 | 81.6 | 100 | 96 | 100 | 100 | 96 |
| Amount of copper used (mL) | 6.4 | 4.2 | 5.3 | 6.1 | 6.6 | 6.5 | 7.6 | 3.8 | 7.6 | 7.6 | 3.8 |

TABLE 1-continued

| | | | | | | | | | | | | |
|---|---|---|---|---|---|---|---|---|---|---|---|---|
| Volume of catalyst (mL) | 115 | 115 | 115 | 115 | 115 | 115 | 115 | 115 | 115 | 115 | 115 | 115 |
| Bed temperature (° C.) | 320 | 385 | 317 | 334 | 340 | 329 | 322 | 350 | 350 | 350 | 350 | 350 |
| Concentration of hydrogen (Volume %) | 60.6 | 69.1 | 64.6 | 65.5 | 64.6 | 61.6 | 65.0 | 66.9 | 66.1 | 66.2 | 65.8 | 67.2 |
| Concentration of CO (Volume %) | 1.0 | 1.8 | 1.7 | 1.6 | 1.7 | 1.6 | 3.2 | 1.5 | 1.5 | 1.8 | 2.4 | 1.6 |
| Rate of reform of DME (%) | 55 | 71 | 62 | 64 | 71 | 57 | 97 | 86 | 83 | 82 | 98 | 86 |

| Example/Compara. Ex. | Ex. 20 | Ex. 21 | Ex. 22 | Ex. 23 | Ex. 24 | Ex. 25 | Compara. Ex. 1 | Compara. Ex. 2 | Compara. Ex. 3 |
|---|---|---|---|---|---|---|---|---|---|
| Amount of catalyst (g) | 96 | 96 | 94 | 99 | 96 | 96 | 150 | 121 | 100 |
| Amount of copper used (mL) | 3.8 | 3.8 | 1.9 | 5.7 | 3.8 | 3.8 | 75.2 | 37.6 | 7.6 |
| Volume of catalyst (mL) | 115 | 115 | 115 | 115 | 115 | 115 | 115 | 115 | 115 |
| Bed temperature (° C.) | 350 | 350 | 350 | 350 | 350 | 350 | 300 | 318 | 350 |
| Concentration of hydrogen (Volume %) | 66.8 | 69.1 | 58 | 69.3 | 67.6 | 68.2 | 10.1 | 17.2 | 57.2 |
| Concentration of CO (Volume %) | 1.6 | 1.6 | 2.4 | 1.5 | 1.9 | 2.1 | 4.8 | 4.9 | 2.4 |
| Rate of reform of DME (%) | 85 | 90 | 67 | 91 | 89 | 98 | 5 | 7 | 59 |

It is obviously seen from TABLE 1 that Examples 1–6 produced high concentration of hydrogen, as compared with Comparative Examples 1 and 2. It is also seen therefrom that despite of the same amount of copper used (copper and zinc in Example 16), Examples 15–18 produced increased concentration of hydrogen, as compared with Comparative Example 3. It is further seen therefrom that Examples 19–25 presented an increased proportion of concentration of hydrogen to the amount of copper used, as compared with Comparative Example 3.

Figure 2:
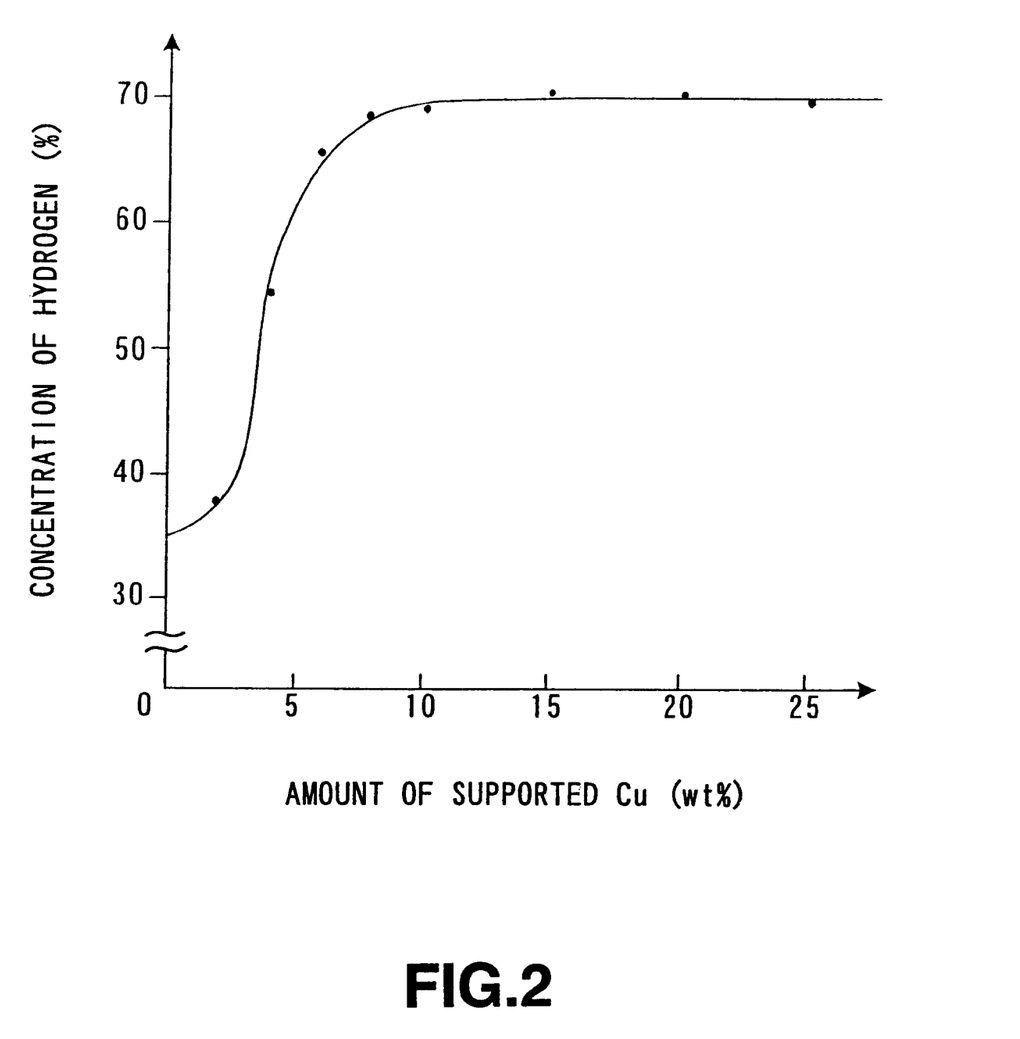
FIG. 2 is a correlation diagram plotting concentration of hydrogen against the amount of supported copper.

Subsequently, dimethyl ether was reformed under the same conditions as above (bed temperature of 385° C.) by use of the gas circulation reactors packing therein the catalysts of Examples 7–14, respectively. After the concentration (volume %) of hydrogen flown out from the reactor was measured, the concentration of hydrogen was plotted against the amount of supported copper. The results are shown in FIG. 2.

It is obviously seen from FIG. 2 that when the amount of supported copper to γ-alumina is below 4 weight %, the concentration of hydrogen reduces sharply, while on the other hand, when the amount of supported copper to γ-alumina is above 20 weight %, the effect of improvement of the concentration of hydrogen for the amount of copper used is not produced so much.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A dimethyl ether reforming catalyst for reforming dimethyl ether to obtain a mixed gas having a high concentration of hydrogen comprising:
   dimethyl ether reforming catalyst wherein copper, or copper and at least one transition metal except said copper is supported on a solid acid;
   wherein said solid acid is at least one material selected from the group consisting of activated alumina and silica-alumina;
   said at least one transition metal is selected from the group consisting of Cr, Mn, Fe, Co, Ni and Zn; and
   wherein an amount of supported copper, or an amount of supported copper and at least one transition metal except said copper, to said solid acid is 4–20 weight %.

2. The dimethyl ether reforming catalyst according to claim 1, which is produced by said copper, or said copper and said at least one transition metal except said copper being supported on said solid acid formed to have a predetermined size.

3. The dimethyl ether reforming catalyst according to claim 2, wherein said solid acid is molded into a fine form.

4. The dimethyl ether reforming catalyst according to claim 2, wherein said solid acid is molded into a pellet form having a diametral length of 3.5 mm or less.

5. The dimethyl ether reforming catalyst according to claim 2, wherein said solid acid is molded into a grain form having a particle size of 2 mm or less.

6. The dimethyl ether reforming catalyst according to claim 1, which is produced by said copper, or said copper and said at least one transition metal except said copper being supported on said solid acid and then being pulverized.

7. The dimethyl ether reforming catalyst according to claim 6, which is pulverized into a fine form.

8. The dimethyl ether reforming catalyst according to claim 6, which is pulverized to have a particle size of 2 mm or less.

9. The dimethyl ether reforming catalyst according to claim 1, which further comprises a solid strong acid.

10. The dimethyl ether reforming catalyst according to claim 9, wherein said solid strong acid is solidified phosphoric acid and/or heteropoly acid.

11. The dimethyl ether reforming catalyst according to claim 9, wherein said solid acid and said solid strong acid have a fine form.

12. The dimethyl ether reforming catalyst according to claim 9, wherein said solid acid and said solid strong acid have a particle size of 2 mm or less.

13. The dimethyl ether reforming catalyst according to claim 9, wherein said solid acid and said solid strong acid are in volume ratios in the range of 1:3 to 3:1.

14. The dimethyl ether reforming catalyst according to claim 1, which is used for a fuel cell device.

* * * * *